(12) United States Patent
Jogand-Coulomb (10) Patent No.: US 8,504,834 B2
(45) Date of Patent: Aug. 6, 2013

(54) METHOD AND SYSTEM FOR ACTIVATION OF LOCAL CONTENT WITH LEGACY STREAMING SYSTEMS

(75) Inventor: Fabrice E. Jogand-Coulomb, Allauch (FR)

(73) Assignee: SanDisk Technologies Inc., Plano, TX (US)

( * ) Notice: Subject to any disclaimer, the term of this patent is extended or adjusted under 35 U.S.C. 154(b) by 0 days.

(21) Appl. No.: 13/341,590

(22) Filed: Dec. 30, 2011

(65) Prior Publication Data

US 2013/0173919 A1    Jul. 4, 2013

(51) Int. Cl.
*H04L 9/32* (2006.01)
(52) U.S. Cl.
USPC .......................................................... 713/168
(58) Field of Classification Search
USPC .......................................................... 713/168
See application file for complete search history.

(56) References Cited

U.S. PATENT DOCUMENTS

| | | | |
|---|---|---|---|
| 7,185,362 B2 | 2/2007 | Hawkes et al. | |
| 7,426,637 B2 | 9/2008 | Risan et al. | |
| 7,627,121 B1* | 12/2009 | Reeds et al. | 380/260 |
| 2005/0190920 A1* | 9/2005 | Ahonen | 380/274 |
| 2006/0029228 A1* | 2/2006 | Lagrange et al. | 380/201 |
| 2007/0014536 A1 | 1/2007 | Hellman | |
| 2007/0055982 A1 | 3/2007 | Spilo | |
| 2007/0057828 A1* | 3/2007 | Kimura | 341/118 |
| 2008/0032788 A1* | 2/2008 | Carlson | 463/29 |
| 2009/0067629 A1* | 3/2009 | Kraszewski | 380/251 |
| 2009/0183205 A1 | 7/2009 | McCartie et al. | |

FOREIGN PATENT DOCUMENTS

| | | |
|---|---|---|
| GB | 2 405 297 | 2/2005 |
| WO | WO 2011/041916 A1 | 4/2011 |

OTHER PUBLICATIONS

"Method and Apparatus for Protecting Cached Streams," U.S. Appl. No. 13/331,266, filed Dec. 20, 2011, inventors: Judah Hahn and Avraham Schmuel.
International Search Report and Written Opinion for PCT/US2012/065417, dated Mar. 21, 2013, 10 pages.

* cited by examiner

*Primary Examiner* — Kambiz Zand
*Assistant Examiner* — Abiy Getachew
(74) *Attorney, Agent, or Firm* — Brinks Hofer Gilson & Lione (57) ABSTRACT

A method and system for activation of local content with legacy streaming systems are disclosed. In one embodiment, a storage device stores encrypted content. The encrypted content can be preloaded or downloaded into the storage device. To consume the content, a host device using the storage device receives a stream of data from a network. The host device then derives a key from the received stream of data and decrypts the encrypted content using the key derived from the received stream of data. Other embodiments are possible, and each of the embodiments can be used alone or together in combination.

26 Claims, 7 Drawing Sheets

METHOD AND SYSTEM FOR ACTIVATION OF LOCAL CONTENT WITH LEGACY STREAMING SYSTEMS

BACKGROUND

Several mobile content services are available that allow a user to enjoy content, such as a song, movie, game, or app, on a mobile device, such as a cell phone. In some environments, the mobile device is used in conjunction with a removable storage device, such as a Secure Digital (SD) card, and content is pre-loaded on and/or downloaded to the card in an encrypted form to prevent unauthorized access of the content. In order to access the content, the mobile device contacts a digital rights management (DRM) server for information (e.g., a decryption key) needed to allow the content to be accessed. One disadvantage with this type of system is that the use of a DRM server to deliver the decryption key is often subject to expensive licensing fees. Also, communication with a DRM server can be complicated, as the information provided by the DRM server is usually targeted to an individual device, which requires specific dialog between the DRM servers and the individual device. In another type of mobile content system, instead of requesting a key from a DRM server, a user subscribes to a content subscription service, and the user can access all of the content associated with that subscription so long as the user is a valid subscriber. One disadvantage to this type of service is that it does not support the activation of individual pieces of content, as the subscription applies to the whole set of content.

In yet another type of mobile content system, instead of accessing content that has been pre-loaded or downloaded to a memory card, the mobile device can access a server that streams the content to the mobile device. In such a service, the mobile device would typically contact the server and, after performing certain accounting, authorization, and authentication steps, would be redirected to a session URL, which would provide streaming content to the mobile device. While streaming avoids the complex communication and expensive licensing fees associated with DRM servers and also provides control over individual pieces of content (unlike subscription services), streaming services require both continuous access to a network and bandwidth, both of which may not always be readily available. Also, streamed content may be of lower quality than pre-loaded or downloaded content.

OVERVIEW

Embodiments of the present invention are defined by the claims, and nothing in this section should be taken as a limitation on those claims.

By way of introduction, the below embodiments relate to a method and system for activation of local content with legacy streaming systems. In one embodiment, a storage device stores encrypted content. The encrypted content can be pre-loaded or downloaded into the storage device. To consume the content, a host device using the storage device receives a stream of data from a network. The host device then derives a key from the received stream of data and decrypts the encrypted content using the key derived from the received stream of data. Other embodiments are possible, and each of the embodiments can be used alone or together in combination. Accordingly, various embodiments will now be described with reference to the attached drawings.

DETAILED DESCRIPTION OF THE PRESENTLY PREFERRED EMBODIMENTS

Introduction

In general, the following embodiments integrate existing streaming server environments into ecosystems where encrypted content is preloaded or downloaded onto a storage device. In one embodiment, encrypted content is preloaded or downloaded onto a storage device. Unlike systems in which a DRM server is contacted for a key to decrypt the encrypted content, a host device of these embodiments contacts a server used to stream content. However, instead of receiving streamed content from this server, the host device (e.g., an app on the host device) receives a relatively small amount of information from which the host device derives a key. For example, in one embodiment, the information is a much smaller-size data file as compared to the streamed version of the content. In another embodiment, the information is some part of the streamed version of the content file. For example, the information can be the beginning of the lower-quality version (lower quality as compared to the version stored on the storage device) adapted for streaming.

The host device uses the derived key to decrypt the encrypted content, so that the content can be rendered from the storage device instead of streamed from the server. This provides a "best of both worlds" solution that offers the advantages of streaming services (e.g., avoiding complex communications and expensive DRM licensing fees, while providing control over individual pieces of content) without the associated network and bandwidth limitations; thus, allowing a higher-quality version of the content to be enjoyed. Also, because existing streaming servers are used, these embodiments can take advantage of the activation, authorization, and accounting mechanisms already provided by those servers.

Before turning to these and other embodiments, the following section describes exemplary host and storage devices. It should be noted that these exemplary host and storage devices are merely examples and that other architectures can be used.

Exemplary Host and Storage Devices

Figure 1:
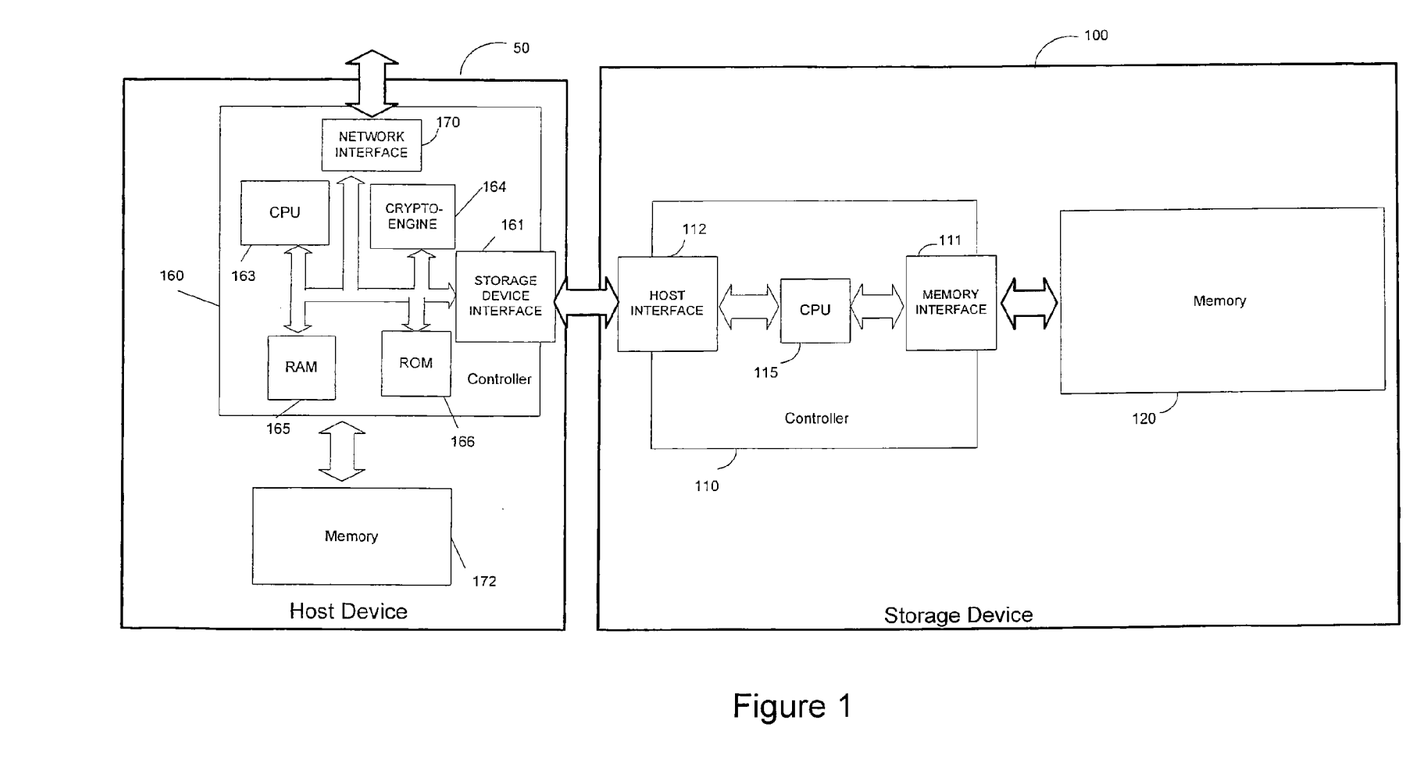
FIG. 1 is a block diagram of an exemplary host device and storage device of an embodiment.

Turning now to the drawings, FIG. 1 is a block diagram of a host device 50 in communication with a storage device 100 of an embodiment. As used herein, the phrase "in communication with" could mean directly in communication with or indirectly in communication with through one or more components, which may or may not be shown or described herein. For example, the host device 50 and storage device 100 can each have mating physical connectors (interfaces) that allow the storage device 100 to be removably connected to the host device 50. The host device 50 can take any suitable form, such as, but not limited to, a mobile phone, a digital media player, a game device, a personal digital assistant (PDA), a personal computer (PC), a kiosk, a set-top box, a TV system, a book reader, or any combination thereof. In this embodiment, the storage device 100 is a mass storage device that can take any suitable form, such as, but not limited to, a handheld, removable memory card (such as a Secure Digital (SD) card or a MultiMedia Card (MMC)), a universal serial bus (USB) device, and a removable or non-removable hard drive (e.g., magnetic disk or solid-state drive). Alternatively, the storage device 100 can take the form of an embedded memory (e.g., a secure module embedded in the host device 50), such as an iNAND™ eSD/eMMC embedded flash drive by SanDisk Corporation.

As shown in FIG. 1, the storage device 100 comprises a controller 110 and a memory 120. The controller 110 comprises a memory interface 111 for interfacing with the memory 120 and a host interface 112 for interfacing with the host 50. The controller 110 also comprises a central processing unit (CPU) 115. The controller 110 can be implemented in any suitable manner. For example, the controller 110 can take the form of a microprocessor or processor and a computer-readable medium that stores computer-readable program code (e.g., software or firmware) executable by the (micro) processor, logic gates, switches, an application specific integrated circuit (ASIC), a programmable logic controller, and an embedded microcontroller, for example. Examples of controllers include, but are not limited to, the following microcontrollers: ARC 625D, Atmel AT91SAM, Microchip PIC18F26K20, and Silicon Labs C8051F320. The memory 120 can take any suitable form. In one embodiment, the memory 120 takes the form of a solid-state (e.g., flash) memory and can be one-time programmable, few-time programmable, or many-time programmable. However, other forms of memory, such as optical memory and magnetic memory, can be used.

It should be noted that the storage device 100 shown in FIG. 1 is but one of many possible implementations. A different implementation is described in detail below in conjunction with FIG. 8. Also, while the implementations shown in FIGS. 1 and 8 have a processor (CPU) "in front of" the memory, it should be understood that storage devices can be used that do not have a processor (or that have a processor but positioned in a different arrangement or used for a different purpose).

Turning now to the host device 50, the host device 50 comprises a controller 160 that has a storage device interface 161 for interfacing with the storage device 100 and a network interface 170 for interfacing with a network. The network interface 170 can use any suitable technology, such as, but not limited to, a wireless transceiver for wirelessly communicating with the network or a wired connection for a network connector, such as an Ethernet cable. The controller 160 also comprises a central processing unit (CPU) 163, a crypto-engine 164 operative to provide encryption and/or decryption operations, read access memory (RAM) 165, and read only memory (ROM) 166. The storage device 100 also contains a memory 172 for storing, for example, applications (apps) and programs (e.g., a browser, a media player, etc.) used in the operation of the host device 50. The host device 50 can contain other components (e.g., a display device, a speaker, a headphone jack, a video output connection, etc.), which are not shown in FIG. 1 to simplify the drawings. Also, other implementations of the host device 50 are possible. For example, instead of containing a hardware crypto-engine, the CPU 163 of the host device 50 may be able to perform cryptographic operations in software at a desirable speed.

In general, the host device 50 is operable to render content stored in the storage device 100. As used herein, "content" can take any suitable form, including, but not limited to, a song, a movie, a game, an application ("app"), a game installer, etc. Depending on the type of content, "render" can mean playing (e.g., when the content is a song or movie), deciphering (e.g., when the content is a game installer), or whatever action is needed to "enjoy" the content. In some embodiments, the host device 50 contains the necessary software to render the content (e.g., a media player), whereas, in other embodiments, such software is provided to the host device 50 by the memory device 100 or another entity. Also, the content file can contain not only the content itself but also metadata with a network location to an application that can render the content or other information needed to render the content.

With the exemplary host and storage devices now explained, the following sections provide a brief overview of legacy streaming systems, followed by a detailed discussion of embodiments related to activation of local content with legacy streaming systems.

Brief Overview of Legacy Streaming Systems

Figure 2:
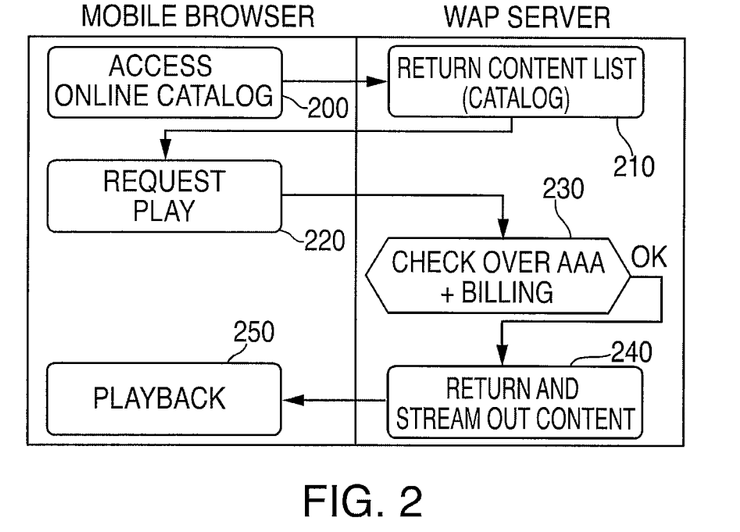
FIG. 2 is a flow chart that illustrates a typical streaming environment when content takes the form of a song or movie.
Figure 3:
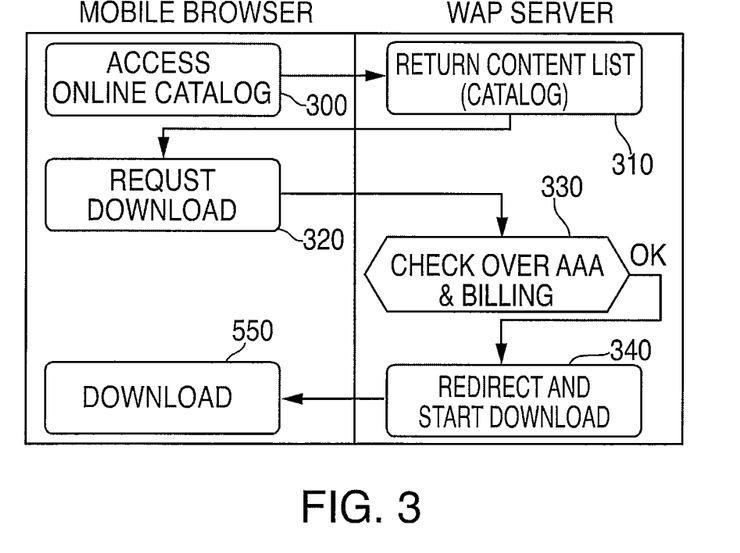
FIG. 3 is a flow chart that illustrates a typical streaming environment when content takes the form of an app.

FIGS. 2 and 3 are flow charts illustrating the general process involved in a typical streaming environment when content takes the form of a song or a movie (FIG. 2) or an application (app) or game (FIG. 3). Turning first to FIG. 2, FIG. 2 shows the communication between a mobile browser on the host device 50 and a wireless application protocol (WAP) server in a network. First, the mobile browser sends a request to access an online catalog showing the content available for steaming to the host device 50 (act 200). This can be in the form of accessing a page presenting the content. In response to the access request, the WAP server returns the content list (catalog) (act 210). The user then requests a desired piece of content to be played (act 220). In response to this request, the WAP server performs an accounting, authorization, and authentication ("AAA") check to verify that the user is authorized to received the requested content, and, optionally, bill the user for the playing of the content (act 230). Authorization and authentication are desired in this environment if the content is streamed to the host device in the clear. (In many present day host devices, the host device is powerful enough to receive and decode a content stream from a network but not powerful enough to also decrypt encrypted content at the same time. Further, if the content were delivered in an encrypted form, some of the complexities associated with DRM environments may need to be introduced to decrypt the content.) If the AAA check and the optional billing step are successfully, the WAP server then redirects the mobile browser to a session URL that will provide the streaming content (act 240). (In some environments, additional acts may be performed before content is received from the WAP server.) A "session URL" is a URL that is valid for only a single session, which prevents unauthorized access to the content if the URL is shared with unauthorized users. The host device 50 then plays back the content as it receives the stream (act 250). Because the content is streamed, the host device 50 simply renders the content as it is received and does not store the streamed content for later playback.

Turning now to FIG. 3, when the content takes the form of an app or game, the acts of requesting the catalog (act 300), returning the content list (act 310), requesting downloading (act 320), performing a AAA check (act 330), and redirecting the mobile browser to a session URL (act 340) are similar to the corresponding acts shown in FIG. 2. However, unlike the situation when the content is a song or movie, the app or game is stored in the host device 50, and the host device 50 can store the app or game in hidden memory to prevent copying or unauthorized access.

Embodiments Related to Activation of Local Content with Legacy Streaming Systems As mentioned above, while there are advantages to using the typical streaming services illustrated in FIGS. 2 and 3, streaming services require both continuous access to a network and bandwidth, both of which may not always be readily available. Additionally, the quality of the content (e.g., bit rate of a song or frame rate of a movie) may not be as good as that of content that is locally stored on a memory device in a DRM environment. These embodiments described below can be used to provide a "best of both worlds" solution and will now be introduced with reference to FIG. 4.

Figure 4:
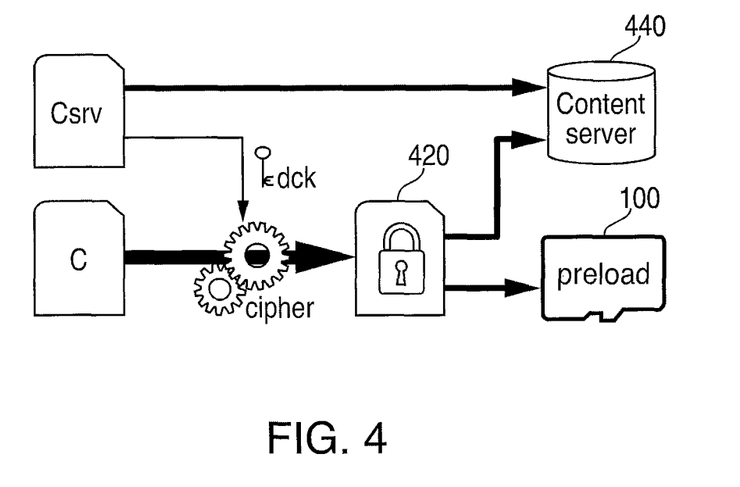
FIG. 4 is a block diagram of an embodiment illustrating the staging of content on local storage for activating with legacy streaming systems.

FIG. 4 is a block diagram of an embodiment illustrating the staging of content on local storage (e.g., storing content on a storage device 100 connected to the host device 50) for activating with legacy streaming systems. In one embodiment, the content is stored in the storage device 100 in an encrypted form to prevent unauthorized access to the content (ensuring that the content is purchased before being consumed or providing a mechanism for controlled playback) and provide copy-control typically required by content providers. Because the content is encrypted, an encryption key is needed to decrypt the content. These embodiments rely on a streaming content server to deliver activation information to allow the user to consume the content staged locally on the storage device once the server has authorized the activation. (The content server can also deliver the protected content itself that gets staged locally, if the protected content is not pre-loaded into the storage device.)

As shown in FIG. 4, content C that is aimed to be staged on local storage (i.e., stored in the storage device 100) is protected with a key derived from some or all of the data referred to in FIG. 4 as Csrv. "Csrv" stands for "content server" and refers to the fact that this data will be published on a content server 440 as associated with content C. (As will be described below, the published Csrv will be streamed to authorized devices in order to decrypt encrypted content.) Csrv can be a small file, a low-quality version of the content itself, or any other data that is streamed or downloaded following the same process as any other content on the server. In one embodiment, each piece of content in this system will be associated with its own Csrv. As illustrated in FIG. 4, a key (Kdck) is derived from part or all of Csrv and is used to cipher (e.g., using a hash or secret function) the content C to provide encrypted content 420. This encrypted content 420 can then be published on the content server 440 and be made available for downloading. Alternatively or additionally, the encrypted content 420 can be pre-loaded into the storage device 100.

In the embodiment shown in FIG. 4, the derived key (Kdck) is the content encryption key (CEK) in clear form, as it is this key that is used to cipher and decipher the content C. To provide an additional level of security, a separate CEK can be used to encrypt the content C, and the CEK can be stored in an encrypted form (encrypted with Kdck) in the host device 50 or the storage device 100. In this alternative, the host device 50 or storage device 100 would use the derived key (Kdck) to decrypt the encrypted CEK, and then use the decrypted CEK to decrypt the encrypted content. Other alternatives can be used. For example, as will be described in more detail below, the derived key (Kdck) can be used as a log-in credential to an account on the host device 50 or the storage device 100 that stores the CEK. As can be seen from these examples, the derived key (Kdck) can be, but does not necessarily need to be, the CEK. Accordingly, the phrase "decrypting encrypted content using a key derived from a received stream of data" is used herein to broadly refer to use cases where the derived key is used to directly decrypt the encrypted content (such as where the derived key is the CEK) or indirectly decrypt the encrypted content (such as where the derived key is used to decrypt an encrypted CEK, which is used to decrypt the encrypted content, or where the derived key is used as a log-in credential to an account holding the CEK).

Figure 5:
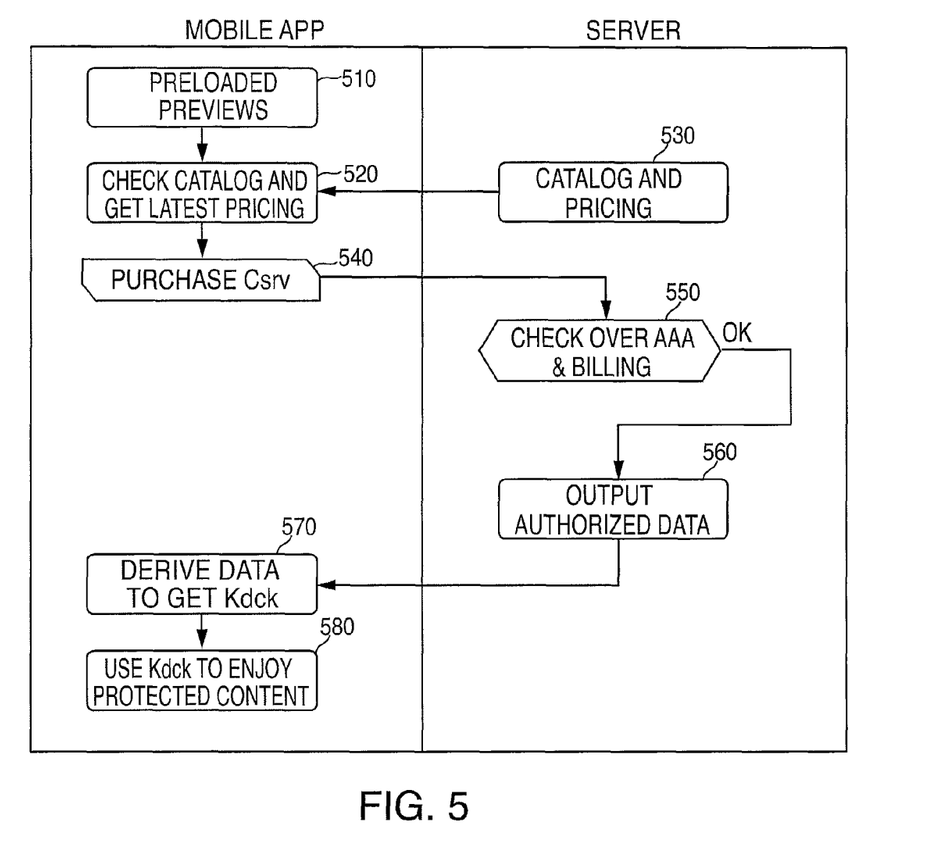
FIG. 5 is a flow chart of an embodiment for activating content that has been preloaded or previously downloaded to a storage device.

Because consumption of the protected content in this embodiment requires the use of a key (Kdck) derived from Csrv, consumption of the protected content in this embodiment involves receiving Csrv from the content server. FIG. 5 is a flow chart of this consumption process (here, the encrypted content is either pre-loaded or downloaded before purchase of Csrv). As shown in FIG. 5, if the host device 50 or storage device 100 stores preloaded previews of content (e.g., movie trailers, snippets of songs, a trial period of game play), a user can use a mobile app on the host device 50 to enjoy the preloaded previews to decide whether he wants to purchase the content (act 510). The mobile app on the host device 50 can then connect to the server to request a catalog of content and latest pricing (act 520), which is delivered from the server (act 530). As the server may contain both the "regular" streaming version of the content as well as the Csrv to activate a locally-storage version of the content, the catalog may provide a notation or other distinction as an alert to the user, so he does not purchase the wrong item. In response to the request for the Csrv, the server performs an accounting, authorization, and authentication ("AAA") check to verify that the user is authorized to receive the requested content, and, optionally, bills the user for the playing of the content (act 550). If the AAA check and the optional billing step are successful, the server then streams (or allows for download of) the Csrv to the host device 50 (act 560). In some embodiments, this involves redirecting the mobile app to a session URL that will stream the Csrv to the host device 50. As mentioned above, a "session URL" is a URL that is valid for only a single session, which prevents unauthorized access to the content if the URL is shared with unauthorized users. The mobile app on the host device 50 then derives the key (Kdck) from the streamed data (act 570). Each host device is this ecosystem can be configured with the same security function to derive a key from streamed data (e.g., performing the same hash function on the first 300 bytes of data in the stream), or each host device can be configured to perform a plurality of security functions, and information in the streamed data (e.g., in the header or in the body of the data stream) can inform the host device which of the security functions to use to derive the key. Also, if only part of the stream is used derive the key, once that part of the stream is delivered to the host device 50, the streaming process can stop.

The host device 50 then uses the derived key (Kdck) to decrypt the encrypted content, so that the content can be enjoyed (act 580). As mentioned above, this can involve directly decrypting the encrypted content with the derived key (Kdck) (such as where the derived key is the CEK) or indirectly decrypting the encrypted content with the derived key (Kdck) (such as where the derived key is used to decrypt an encrypted CEK, which is needed to decrypt the encrypted content, or where the derived key is used as a log-in credential to an account storing the CEK). In this embodiment, after the content is decrypted and rendered, the host device 50 discards the derived key (Kdck) rather than storing it. Accordingly, for subsequent plays of the content, the above-described process would be repeated. However, as will be described below, in other embodiments, the derived key (Kdck) can be securely stored in the host device 50 or the storage device 100 for future authorized uses.

Figure 6:
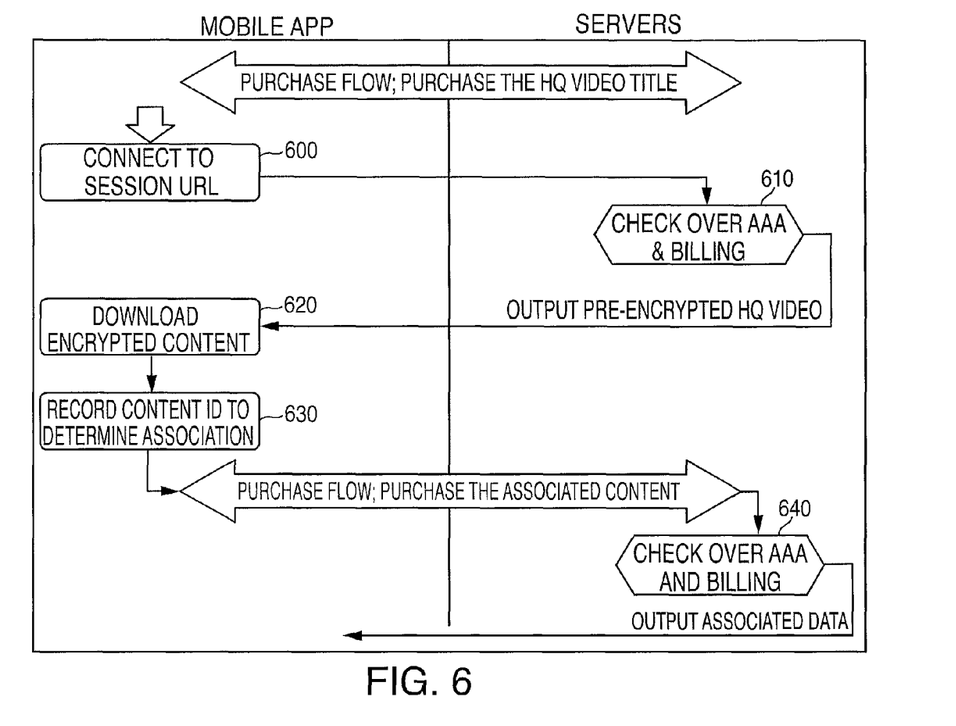
FIG. 6 is a flow chart of an embodiment for activating content that has been downloaded to a storage device as part of the activation process.

The embodiment described in FIG. 5 related to the use case where encrypted content is either preloaded in the storage device 100 or downloaded to the storage device 100 before the purchase of Csrv. FIG. 6 relates to the situation where the protected content is downloaded as part of the activation process. Since the content server contains Csrv and also contains a streamed version of the content, one option is to obtain both the content and the Csrv from the same streaming server. (While streamed content from a streaming server is typically not stored in a host device, the host device can be configured to store the streamed content in a secured fashion to protect against unauthorized access and copying.) However, as the quality of streamed content is typically lower than that of pre-loaded or downloaded content, in one embodiment, two servers are used—one from which to downloaded an encrypted, higher-quality version of the content and another (a streaming server) from which to stream the Csrv. This embodiment will now be described with reference to FIG. 6.

As indicated by the top, double-sided arrow in FIG. 6, the first set of acts in the process is to purchase the high-quality encrypted content. (While FIG. 6 refers to a video title, it should be understood that other forms of content can be used, such as, for example, songs, apps, and games installers). First, the mobile app on the host device 50 contacts the server housing the encrypted content (act 600). The server then performs an accounting, authorization, and authentication ("AAA") check to verify that the user is authorized to receive the encrypted content, and, optionally, bill the user for the encrypted content (act 610). (The server can also provide open access to the encrypted content (i.e., no access control).) In this embodiment, it is unlikely that the user would be charged for the encrypted content; instead, a purchase event would more likely take place later, when activation data is provided to enable the host device 50 to decrypt the content.

The host device 50 then downloads encrypted content (act 620) and stores the encrypted content, as well as a content ID, in the storage device 100 (act 630). The content ID preferably provides enough information to allow the host device 50 to know what Csrv to request from the streaming server, as the content and Csrv are stored in different servers in this embodiment.

After the first set of transactions is performed to receive the encrypted content, a second set of transactions is performed to gain access to the associated content used to derive the content key, as indicated by the lower double-headed arrow. (In this embodiment, this second set of transactions would only be performed when the user wants to buy or access the content.) The process of obtaining the Csrv, deriving the key from the Csrv, and using the derived key to decrypt the encrypted content is similar to the process described above in FIG. 5; however, the host device 50 would provide the server with the content ID of the content, from which the server can identify which Csrv to stream to the host device. Also, as mentioned above, in some embodiments, it is this accounting, authorization, and authentication ("AAA") check (act 640)— not the earlier transaction 610 to obtain the encrypted content—where the user would get charged. In this way, the user would only get charged once for a given piece of content and would get charged for the content piece at the time of activation/consumption rather than at acquisition.

Figure 7:
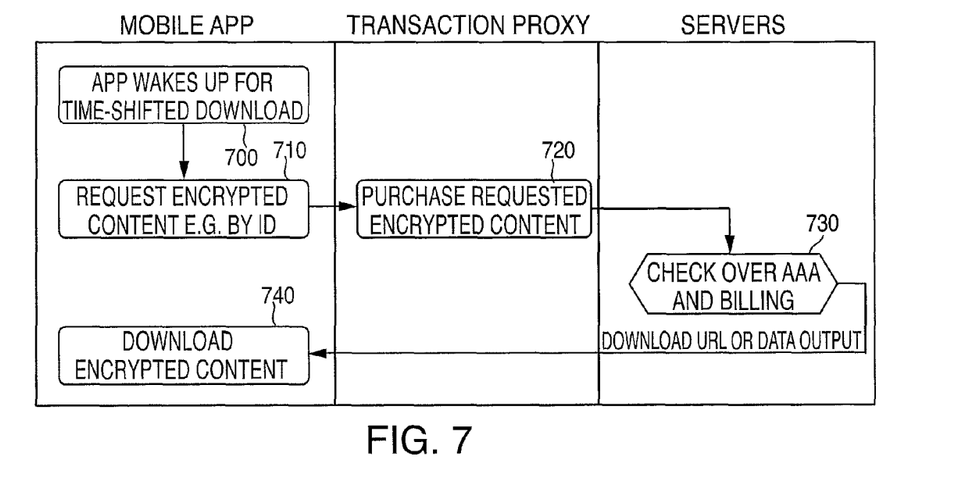
FIG. 7 is a flow chart of an embodiment for using an intermediate proxy to enable time shifting.

Because obtaining content that is free-of-charge and encrypted does not require identifying a specific user, the mobile app on the host device 50 can leverage an intermediate proxy that is authorized to transact only for the free-of-charge encrypted content to enable time shifting. This alternative is shown in more detail in FIG. 7. As shown in FIG. 7, the mobile app on the host device 50 wakes up for the time-shifted download (act 700) and requests encrypted content (e.g., using a content ID) from a transaction proxy (act 710). The transaction proxy then purchases the requested encrypted content from the server (act 720). As in the prior examples, the server performs an accounting, authorization, and authentication ("AAA") check (act 730) and then provides a session URL or data output, from which the host device 50 can download the encrypted content (act 740). After the downloading is complete, the content can be played using the mechanisms described above. This embodiment provides the advantage of downloading encrypted content during off-peak hours.

In both of the above cases, Kdck can be acquired for each access, thus allowing tracking and providing similar mechanism for analytics as for online content. However, there are some embodiments where there are more advantages to retain Kdck and secure it for multiple uses, as will be described in the following paragraphs.

Turning now to another embodiment, as mentioned above, the storage device 100 can take the form of a typical SD card or other passive storage device. However, in an alternate embodiment, the storage device takes the form of an active, Secure Delivery Card (SDC) card that provides its own form of access control technology. This allows the key to be stored securely in the storage device. Before turning to the specifics of this alternative, an exemplary storage device 800 will now be described with reference to FIG. 8.

Figure 8:
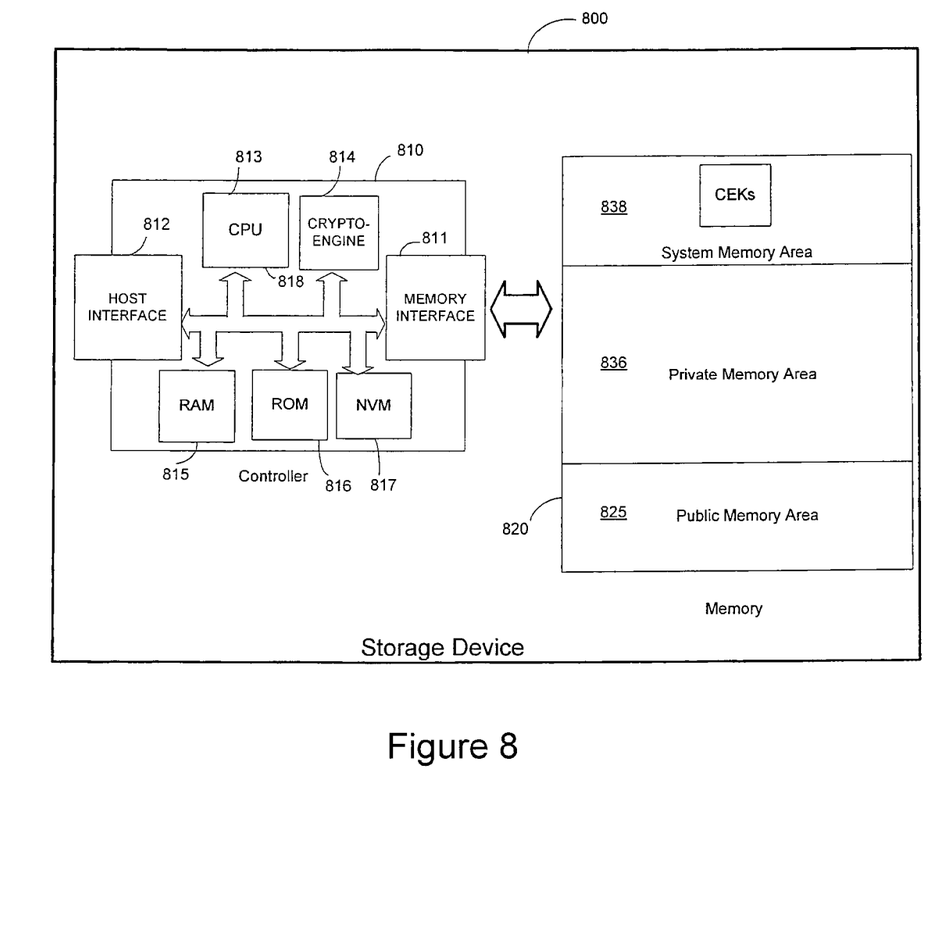
FIG. 8 is a block diagram of a storage device of an embodiment.

As shown in FIG. 8, the storage device 800 comprises a controller 810 and a memory 820. The controller 810 comprises a memory interface 811 for interfacing with the memory 820 and a host interface 812 for interfacing with the host device 50. The controller 810 also comprises a central processing unit (CPU) 813, a hardware crypto-engine 814 operative to provide encryption and/or decryption operations, read access memory (RAM) 815, read only memory (ROM) 816 which can store firmware for the basic operations of the storage device 800, and a non-volatile memory (NVM) 817. The controller 810 can be implemented in any suitable manner. It should be noted that while the hardware crypto-engine 814 is part of the storage device 800 of this embodiment, this is an optional component.

The memory 820 can take any suitable form. In one embodiment, the memory 820 takes the form of a solid-state (e.g., flash) memory and can be one-time programmable, few-time programmable, or many-time programmable. However, other forms of memory, such as optical memory and magnetic memory, can be used. In this embodiment, the memory 820 comprises a public memory area 825 that is managed by a file system on the host device 50, a private memory area 835 that is internally managed by the controller 810, and a system memory area 838 that is also internally managed by the controller 810. While the memory 820 in this embodiment contains a public memory area 825, a private memory area 836, and a system memory area 838, it should be noted that other configurations can be used in different embodiments. For example, in another embodiment, the memory can contain a public memory area and a private memory area but not a system memory area, or a public memory area and system memory area but not a private memory area.

As shown in FIG. 8, the system memory area 838 can store content encryption keys (CEKs) that encrypt content stored in the storage device 800. The public memory area 825, the private memory area 836, and/or the system memory area 838 can be different partitions of the same memory unit or can be different memory units. Also, some or all of the CEKs can be located in the NVM 817 in the controller 810. Other stored items mentioned herein to be stored in a specific memory location may also be stored in a different memory location. Accordingly, for simplicity, the phrase "one or more memories storing" is used herein to reflect this flexibility.

Without intending to be a limitation, the storage device 100 can be a TrustedFlash™ device from SanDisk Corporation. TrustedFlash™ technology protects the content encryption key using access control, and, as such, the content encryption key cannot be freely copied. By storing the CEK on the storage device 800, purchased content can become portable and used on a wide variety of authorized devices. A TrustedFlash™ storage device also has an accounting system, in which a user can attempt to authenticate to a playback account on the storage device, which associates specific users with various permissions and rights to stored CEKs. So, once a user has successfully authenticated to a playback account, the user can use the stored CEK, as specified by the account's permissions, to decrypt and access content that was encrypted with that CEK. The storage device 800 can also be provided with a security system that enables the revocation of a CEK when there is a compromised host device. The process of using the storage device 800 for activating locally stored content will now be described in conjunction with FIG. 9.

Figure 9:
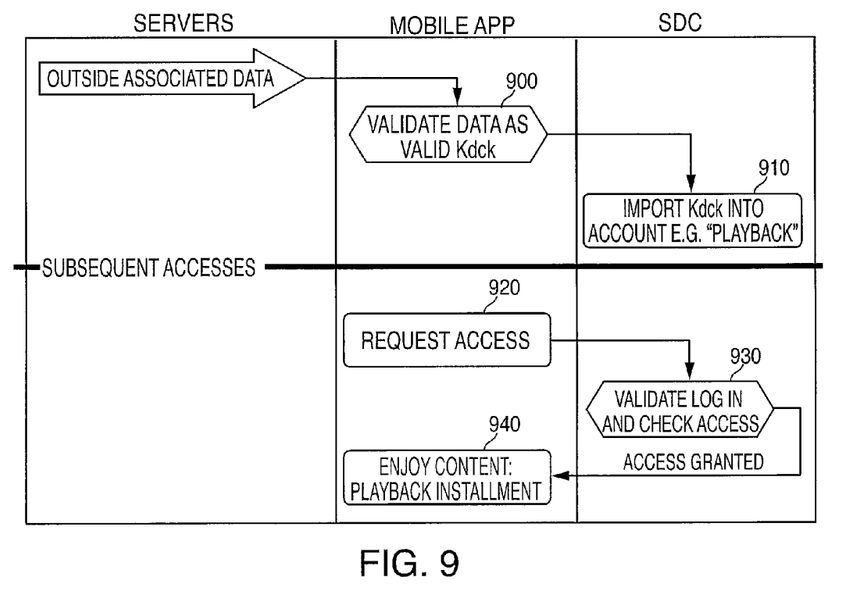
FIG. 9 is a block diagram of an embodiment illustrating activating locally stored content.

As shown in FIG. 9, a server provides associated data to a mobile app on a host device 50, which validates the data as a valid Kdck (act 900). This can be performed during preloading of the storage device 800 or when a user first wants to activate stored content, using the processes as described above. However, instead of discarding the Kdck after playback, as in the above examples, the storage device 800 in this embodiment imports the Kdck into an account in the storage device 800, such as a playback account (act 910). When a user later wishes to access the content, the mobile app on the host device 50 requests access to content (act 920), and the storage device 800 validates the login attempt and checks to see if access is authorized (act 930). If access is authorized, the content is decrypted with the key stored in the storage device 900 and the content is rendered by the host device (act 940). In this way, the host device 50 does not need to go back to the server for subsequent playbacks.

Figure 10:
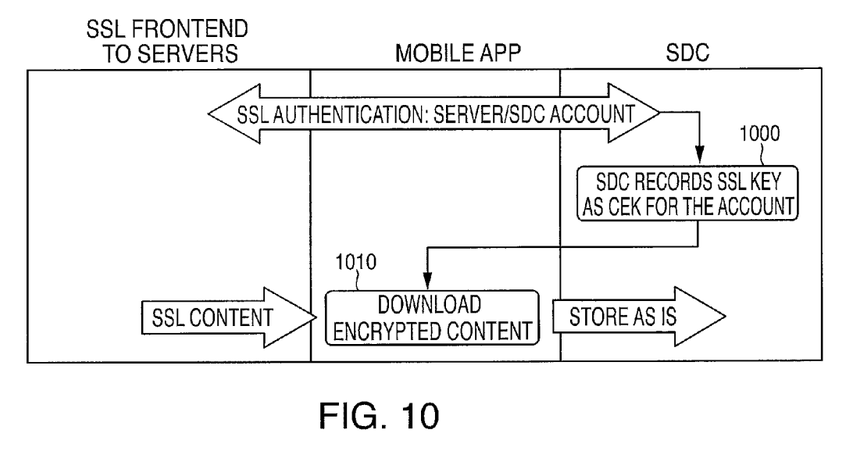
FIG. 10 is a block diagram of an embodiment illustrating activating locally stored content using a secure sockets layer (SSL) key.

In another embodiment, if the storage device 800 has an access control system whose login is compatible with secure sockets layer (SSL) authentication, content can be downloaded over SSL. As such, the content for download does not need to be ciphered, and an SSL frontend can be used to establish a direct secure connection with the storage device 800. In that case, the CEK used to store the content can be generated from both the content and the server. This embodiment is shown in FIG. 10. As shown in FIG. 10, the storage device 800 (the SDC) records the SSL key as the CEK for the account (act 1000). The SSL key is recorded into the appropriate account as the CEK for the content, which can be a purchase account rather than the playback account. The mobile app on the host device 50 then downloads the content ciphered with the SSL (act 1010). As illustrated in FIG. 10, the SSL content provided to the mobile app can be stored as-is in the storage device 800. However as the CEK is randomized by the SSL, a transaction proxy may be required to enable this use cases and activate the content when authorized by the server. Otherwise, the solution may only be applicable to downloaded content after purchase. For example, a transaction proxy can check the streamed data over its database and only authorized the "playback" account to access the recorded CEK accordingly. In summary, in this embodiment, the CEK is the SSL key. The CEK is protected, and the derived key is a mechanism to authorize access to the CEK (e.g., when used to login to an account or when a proxy is used to authorize the playback account to access the SSL key, and the CEK recorded in a "server account"). That is, the content comes encrypted using the SSL key (i.e., the content is not encrypted ahead of time). As the content comes encrypted by the SSL key, there is no need to encrypt the content again. The content is stored as it comes in (i.e., SSL-key-encrypted), and the SSL key is saved for future use when authorized access to the content is granted.

There are several alternatives that can be used with these embodiments. For example, the associated content can contain more information than just the information needed for the derived content key. The additional information can be, for example, information that allows a match between the associated content and the Csrv. This could be a content ID or a reference to the content (preferably, it would be the same name). The additional information can also indicate the condition to expire the content (e.g., how many plays, the validity date, etc.). Such information can be used by a local DRM agent in the host device 50. As another alternative, the encrypted content can be formatted to permit verification that the Kdck is valid. This can be important if the Csrv is not delivered properly from the server (e.g., if a communication error takes place). For example, if the content has predictable information, such information can be used to verify the Kdck (e.g., the content embeds data that, when used with Kdck, results in the predictable data)

CONCLUSION

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A host device comprising:
  a network interface through which the host device can connect to and communicate with a network;
  a storage device interface through which the host device can connect to and communicate with a storage device, wherein the storage device stores encrypted content; and
  a controller in communication with the network interface and the storage device interface, wherein the controller is configured to:
    receive a stream of data from the network;
    derive a key from the received stream of data; and
    decrypt the encrypted content using the key derived from the received stream of data.

2. The host device of claim 1, wherein the encrypted content is encrypted with a content encryption key, and wherein the key derived from the received stream of data is the content encryption key.

3. The host device of claim 1, wherein the encrypted content is encrypted with a content encryption key stored on the host device or the storage device in an encrypted form, and wherein the key derived from the received stream of data is used to decrypt the content encryption key stored on the host device or the storage device.

4. The host device of claim 1, wherein the controller is further configured to discard the key derived from the received stream of data after the encrypted data has been encrypted.

5. The host device of claim 1, wherein the controller is further configured to store the key derived from the received stream of data in an account in the storage device.

6. The host device of claim 5, wherein the account stores permissions of users to use the stored key to decrypt the encrypted content.

7. The host device of claim 1, wherein the encrypted content is pre-loaded on to the storage device.

8. The host device of claim 1, wherein the encrypted content is downloaded on to the storage device via the host device.

9. The host device of claim 1, wherein the content is downloaded on to the storage device via the host device using a secure sockets layer (SSL) connection, wherein the content is encrypted using an SSL key, wherein the SSL key is stored in the storage device, and wherein the key derived from the received stream of data is used to access the stored SSL key.

10. The host device of claim 1, wherein the stream of data is received from a network location identified by a session URL.

11. The host device of claim 1, wherein the storage device is embedded in the host device.

12. The host device of claim 1, wherein the stream of data is a file of a smaller size than the content stored in the storage device.

13. The host device of claim 1, wherein the stream of data is a lower-quality version of the content stored in the storage device.

14. A method for activation of local content, the method comprising:
performing the following in a host device in communication with a storage device storing encrypted content:
receiving a stream of data from a network;
deriving a key from the received stream of data; and
decrypting the encrypted content using the key derived from the received stream of data.

15. The method of claim 14, wherein the encrypted content is encrypted with a content encryption key, and wherein the key derived from the received stream of data is the content encryption key.

16. The method of claim 14, wherein the encrypted content is encrypted with a content encryption key stored on the host device or the storage device in an encrypted form, and wherein the key derived from the received stream of data is used to decrypt the content encryption key stored on the host device or the storage device.

17. The method of claim 14 further comprising discarding the key derived from the received stream of data after the encrypted data has been encrypted.

18. The method of claim 14 further comprising storing the key derived from the received stream of data in an account in the storage device.

19. The method of claim 18, wherein the account stores permissions to use the stored key to decrypt the encrypted content.

20. The method of claim 14, wherein the encrypted content is pre-loaded on to the storage device.

21. The method of claim 14, wherein the encrypted content is downloaded on to the storage device via the host device.

22. The method of claim 14, wherein the content is downloaded on to the storage device via the host device using a secure sockets layer (SSL) connection, wherein the content is encrypted using an SSL key, wherein the SSL key is stored in the storage device, and wherein the key derived from the received stream of data is used to access the stored SSL key.

23. The method of claim 14, wherein the stream of data is received from a network location identified by a session URL.

24. The method of claim 14, wherein the storage device is embedded in the host device.

25. The method of claim 14, wherein the stream of data is a file of a smaller size than the content stored in the storage device.

26. The method of claim 14, wherein the stream of data is a lower-quality version of the content stored in the storage device.

* * * * *